(12) United States Patent
Tornqvist

(10) Patent No.: US 8,523,838 B2
(45) Date of Patent: Sep. 3, 2013

(54) CONNECTOR DEVICE

(75) Inventor: Hakan Tornqvist, Saro (SE)

(73) Assignee: Carmel Pharma AB, Gotteborg (SE)

( * ) Notice: Subject to any disclaimer, the term of this patent is extended or adjusted under 35 U.S.C. 154(b) by 608 days.

(21) Appl. No.: 12/635,186

(22) Filed: Dec. 10, 2009

(65) Prior Publication Data
US 2010/0147402 A1 Jun. 17, 2010

Related U.S. Application Data

(60) Provisional application No. 61/122,528, filed on Dec. 15, 2008.

(51) Int. Cl.
*A61M 5/32* (2006.01)

(52) U.S. Cl.
USPC ............. 604/414; 604/68; 604/69; 604/70; 604/71; 604/72; 604/90; 604/411; 604/412; 604/413; 604/415; 604/416

(58) Field of Classification Search
USPC ................................ 604/411–416
See application file for complete search history.

(56) References Cited

U.S. PATENT DOCUMENTS

| | | | |
|---|---|---|---|
| 1,844,342 A | 2/1932 | Berman | |
| 2,010,417 A | 8/1935 | Schwab | |
| 2,697,438 A | 12/1954 | Hickey | |
| 2,717,599 A | 9/1955 | Huber | |
| 3,064,651 A | 11/1962 | Henderson | |
| 3,071,135 A | 1/1963 | Baldwin et al. | |
| 3,308,822 A | 3/1967 | DeLuca | |
| 3,316,908 A | 5/1967 | Burke | |
| 3,340,671 A | 9/1967 | Loo | |
| 3,390,677 A | 7/1968 | Razimbaud | |
| 3,448,740 A | 6/1969 | Figge | |
| 3,542,240 A | 11/1970 | Solowey | |
| 3,584,770 A * | 6/1971 | Taylor | 222/479 |
| 3,783,895 A | 1/1974 | Weichselbaum | |
| 3,788,320 A | 1/1974 | Dye | |

(Continued)

FOREIGN PATENT DOCUMENTS

| | | |
|---|---|---|
| AU | 200112863 | 5/2003 |
| DE | 2005519 | 10/1979 |

(Continued)

OTHER PUBLICATIONS

Taiwan Search Report for Taiwan Patent Application 092106323 dated Mar. 21, 2003 (4 pages).

(Continued)

*Primary Examiner* — Tatyana Zalukaeva
*Assistant Examiner* — Ilya Treyger
(74) *Attorney, Agent, or Firm* — Servilla Whitney LLC

(57) ABSTRACT

The present invention relates to a connector device to connect a first and a second fluid container, directly or indirectly. The connector device exhibit a first and a second connection means, a pierceable barrier member, a piercing member, a fluid transfer channel and a pressure normalization channel. The pressure normalization channel is arranged to normalize an increasing pressure inside second fluid container. A valve arrangement permitting fluid to flow in a first and a second direction is arranged in the pressure normalization channel. The valve arrangement exhibit a cracking pressure in at least the first direction. The present invention provides for a connector device which reduces the risk of clogging the barrier filter.

15 Claims, 4 Drawing Sheets

(56) References Cited

U.S. PATENT DOCUMENTS

| | | |
|---|---|---|
| 3,822,700 A | 7/1974 | Pennington |
| 3,938,520 A | 2/1976 | Scislowicz et al. |
| 3,976,073 A | 8/1976 | Quick et al. |
| 4,096,860 A | 6/1978 | McLaughlin |
| 4,296,786 A | 10/1981 | Brignola |
| D270,568 S | 9/1983 | Armstrong |
| 4,490,139 A | 12/1984 | Huizenga et al. |
| 4,516,967 A | 5/1985 | Kopfer |
| 4,564,054 A | 1/1986 | Gustavsson |
| 4,573,967 A | 3/1986 | Hargrove et al. |
| 4,576,211 A | 3/1986 | Valentini et al. |
| 4,581,016 A | 4/1986 | Gettig |
| 4,582,223 A | 4/1986 | Kobe |
| 4,588,403 A | 5/1986 | Weiss et al. |
| 4,600,040 A | 7/1986 | Naslund |
| 4,623,343 A | 11/1986 | Thompson |
| 4,629,455 A | 12/1986 | Kanno |
| 4,632,673 A | 12/1986 | Tiitola et al. |
| 4,636,204 A | 1/1987 | Christopherson et al. |
| 4,673,400 A | 6/1987 | Martin |
| 4,673,404 A | 6/1987 | Gustavsson |
| 4,737,150 A | 4/1988 | Baeumle et al. |
| 4,752,287 A | 6/1988 | Kurtz et al. |
| 4,759,756 A | 7/1988 | Forman et al. |
| 4,768,568 A | 9/1988 | Fournier et al. |
| 4,792,329 A | 12/1988 | Schreuder |
| 4,804,015 A | 2/1989 | Albinsson |
| 4,822,340 A | 4/1989 | Kamstra |
| 4,826,492 A | 5/1989 | Magasi |
| 4,834,717 A | 5/1989 | Haber et al. |
| 4,842,585 A | 6/1989 | Witt |
| 4,850,978 A | 7/1989 | Dudar et al. |
| 4,864,717 A | 9/1989 | Baus, Jr. |
| 4,872,494 A | 10/1989 | Coccia |
| 4,878,897 A | 11/1989 | Katzin |
| 4,889,529 A | 12/1989 | Haindl |
| 4,898,209 A | 2/1990 | Zbed |
| 4,909,290 A | 3/1990 | Coccia |
| 4,932,937 A | 6/1990 | Gustavsson et al. |
| 4,944,736 A | 7/1990 | Holtz |
| 4,964,855 A | 10/1990 | Todd et al. |
| 4,982,769 A | 1/1991 | Fournier et al. |
| 4,994,048 A | 2/1991 | Metzger |
| 4,997,083 A | 3/1991 | Loretti et al. |
| 5,017,186 A | 5/1991 | Arnold |
| 5,041,105 A | 8/1991 | D'Alo et al. |
| 5,061,264 A | 10/1991 | Scarrow |
| 5,071,413 A | 12/1991 | Utterberg |
| 5,122,116 A | 6/1992 | Kriesel et al. |
| 5,122,123 A | 6/1992 | Vaillancourt |
| 5,137,524 A | 8/1992 | Lynn et al. |
| 5,158,554 A | 10/1992 | Jepson et al. |
| 5,176,673 A | 1/1993 | Marrucchi |
| 5,199,947 A | 4/1993 | Lopez et al. |
| 5,201,725 A | 4/1993 | Kling |
| 5,207,658 A | 5/1993 | Rosen et al. |
| 5,232,109 A | 8/1993 | Tirrell et al. |
| 5,254,097 A | 10/1993 | Schock et al. |
| 5,279,576 A | 1/1994 | Loo et al. |
| 5,279,583 A | 1/1994 | Shober, Jr. et al. |
| 5,279,605 A | 1/1994 | Karrasch et al. |
| 5,308,347 A | 5/1994 | Sunago et al. |
| 5,312,366 A | 5/1994 | Vaillancourt |
| 5,328,480 A | 7/1994 | Melker et al. |
| 5,334,163 A | 8/1994 | Sinnett |
| 5,356,406 A | 10/1994 | Schraga |
| 5,385,545 A | 1/1995 | Kriesel et al. |
| 5,385,547 A | 1/1995 | Wong et al. |
| 5,389,085 A | 2/1995 | D'Alessio et al. |
| 5,405,326 A | 4/1995 | Haber et al. |
| 5,445,630 A | 8/1995 | Richmond |
| 5,447,501 A | 9/1995 | Karlsson et al. |
| 5,456,675 A | 10/1995 | Wolbring et al. |
| 5,470,522 A | 11/1995 | Thome et al. |
| 5,472,123 A * | 12/1995 | Jangaard .................. 222/212 |
| 5,478,328 A | 12/1995 | Silverman et al. |
| 5,478,337 A | 12/1995 | Okamoto et al. |
| 5,492,531 A | 2/1996 | Post et al. |
| 5,514,117 A | 5/1996 | Lynn |
| 5,515,871 A | 5/1996 | Bittner et al. |
| 5,536,259 A | 7/1996 | Utterberg |
| 5,575,780 A | 11/1996 | Saito |
| 5,593,028 A | 1/1997 | Haber et al. |
| 5,613,954 A | 3/1997 | Nelson et al. |
| 5,632,735 A | 5/1997 | Wyatt et al. |
| 5,647,845 A | 7/1997 | Haber et al. |
| 5,685,866 A | 11/1997 | Lopez |
| 5,752,942 A | 5/1998 | Doyle et al. |
| 5,766,147 A | 6/1998 | Sancoff et al. |
| 5,766,211 A | 6/1998 | Wood et al. |
| 5,782,872 A | 7/1998 | Muller |
| 5,795,336 A | 8/1998 | Romano et al. |
| 5,817,083 A | 10/1998 | Shemesh et al. |
| 5,820,609 A | 10/1998 | Saito |
| 5,827,262 A | 10/1998 | Neftel et al. |
| 5,837,262 A | 11/1998 | Golubev et al. |
| 5,875,931 A | 3/1999 | Py |
| 5,879,345 A | 3/1999 | Aneas |
| 5,897,526 A | 4/1999 | Vaillancourt |
| 5,934,510 A | 8/1999 | Anderson |
| 5,984,899 A | 11/1999 | D'Alessio et al. |
| 6,063,068 A | 5/2000 | Fowles et al. |
| D427,308 S | 6/2000 | Zinger |
| 6,070,623 A | 6/2000 | Aneas |
| 6,071,270 A | 6/2000 | Fowles et al. |
| 6,090,091 A | 7/2000 | Fowles et al. |
| 6,113,068 A | 9/2000 | Ryan |
| 6,113,583 A | 9/2000 | Fowles et al. |
| 6,142,446 A | 11/2000 | Leinsing |
| 6,146,362 A | 11/2000 | Turnbull et al. |
| 6,209,738 B1 | 4/2001 | Jansen et al. |
| 6,221,065 B1 | 4/2001 | Davis |
| 6,245,056 B1 | 6/2001 | Walker et al. |
| D445,501 S | 7/2001 | Niedospial, Jr. |
| 6,253,804 B1 | 7/2001 | Safabash |
| 6,258,078 B1 | 7/2001 | Thilly |
| 6,387,074 B1 | 5/2002 | Horppu et al. |
| 6,453,956 B2 | 9/2002 | Safabash |
| 6,471,674 B1 | 10/2002 | Emig et al. |
| 6,517,523 B1 | 2/2003 | Kaneko et al. |
| 6,537,263 B1 | 3/2003 | Aneas |
| 6,571,837 B2 | 6/2003 | Jansen et al. |
| 6,591,876 B2 | 7/2003 | Safabash |
| 6,644,367 B1 | 11/2003 | Savage et al. |
| 6,685,692 B2 | 2/2004 | Fathallah |
| 6,715,520 B2 | 4/2004 | Andreasson et al. |
| 6,761,286 B2 | 7/2004 | Py et al. |
| D495,416 S | 8/2004 | Dimeo et al. |
| 6,786,244 B1 | 9/2004 | Jones |
| D506,256 S | 6/2005 | Miyoshi et al. |
| 6,960,194 B2 | 11/2005 | Hommann et al. |
| 7,000,806 B2 | 2/2006 | Py et al. |
| 7,080,672 B2 | 7/2006 | Fournier et al. |
| 7,297,140 B2 | 11/2007 | Orlu et al. |
| D570,477 S | 6/2008 | Gallogly et al. |
| D572,820 S | 7/2008 | Gallogly et al. |
| D577,438 S | 9/2008 | Gallogly et al. |
| D577,822 S | 9/2008 | Gallogly et al. |
| D582,033 S | 12/2008 | Baxter et al. |
| D605,755 S | 12/2009 | Baxter et al. |
| 7,703,486 B2 | 4/2010 | Costanzo |
| D616,984 S | 6/2010 | Gilboa |
| 7,744,581 B2 | 6/2010 | Wallen et al. |
| 2001/0021825 A1 | 9/2001 | Becker et al. |
| 2001/0025671 A1 | 10/2001 | Safabash |
| 2001/0029360 A1 | 10/2001 | Miyoshi et al. |
| 2002/0002352 A1 | 1/2002 | Becker et al. |
| 2002/0082586 A1 | 6/2002 | Finley et al. |
| 2002/0127150 A1 | 9/2002 | Sasso |
| 2002/0177819 A1 | 11/2002 | Barker et al. |
| 2003/0010717 A1 | 1/2003 | Brugger et al. |
| 2003/0070726 A1 | 4/2003 | Andreasson et al. |
| 2003/0106610 A1 | 6/2003 | Roos et al. |
| 2003/0107628 A1 | 6/2003 | Fowles et al. |

| | | | | | | |
|---|---|---|---|---|---|---|
| 2003/0199846 A1 | 10/2003 | Fowles et al. | FR | 2780878 | 1/2000 | |
| 2003/0233083 A1 | 12/2003 | Houwaert et al. | GB | 1579065 | 11/1980 | |
| 2004/0116858 A1 | 6/2004 | Heinz et al. | JP | 49-12690 | 5/1972 | |
| 2004/0199139 A1 | 10/2004 | Fowles et al. | JP | 288664 | 7/1990 | |
| 2004/0215147 A1 | 10/2004 | Wessman et al. | JP | 3030963 | 8/1996 | |
| 2005/0215977 A1 | 9/2005 | Uschold | JP | 2000167022 | 6/2000 | |
| 2006/0025747 A1 | 2/2006 | Sullivan et al. | JP | 2001505092 | 4/2001 | |
| 2006/0106360 A1 | 5/2006 | Wong | JP | 2001293085 | 10/2001 | |
| 2006/0111667 A1 | 5/2006 | Matsurra et al. | JP | 2004/505682 | 2/2004 | |
| 2006/0157984 A1 | 7/2006 | Rome et al. | TW | 482670 | 4/2002 | |
| 2006/0186045 A1 | 8/2006 | Jensen et al. | WO | WO 84/04672 | 12/1984 | |
| 2007/0021725 A1 | 1/2007 | Villette | WO | WO 84/04673 | 12/1984 | |
| 2007/0060841 A1 | 3/2007 | Henshaw | WO | WO 90/03536 | 4/1990 | |
| 2007/0088313 A1 | 4/2007 | Zinger et al. | WO | WO 98/19724 | 5/1998 | |
| 2007/0106244 A1* | 5/2007 | Mosler et al. ............ 604/411 | WO | WO 99/27886 | 6/1999 | |
| 2007/0179441 A1 | 8/2007 | Chevallier | WO | WO 99/62578 | 12/1999 | |
| 2007/0270759 A1 | 11/2007 | Pessin | WO | WO 00/05292 | 2/2000 | |
| 2007/0270778 A9 | 11/2007 | Zinger et al. | WO | WO 00/35517 | 6/2000 | |
| 2008/0045919 A1 | 2/2008 | Jakob et al. | WO | WO 01/80928 | 11/2001 | |
| 2008/0103453 A1 | 5/2008 | Liversidge | WO | WO 02/02048 | 1/2002 | |
| 2008/0103485 A1 | 5/2008 | Kruger | WO | WO 02/11794 | 2/2002 | |
| 2008/0172039 A1 | 7/2008 | Raines | WO | WO 02/064077 | 8/2002 | |
| 2008/0223484 A1 | 9/2008 | Horppu | WO | WO 02/076540 | 10/2002 | |
| 2008/0287920 A1 | 11/2008 | Fangrow et al. | WO | WO 2005/074860 | 8/2005 | |
| 2008/0312634 A1 | 12/2008 | Helmerson et al. | WO | WO 2006/082350 | 8/2006 | |
| 2009/0254042 A1 | 10/2009 | Gratwohl et al. | WO | WO 2006/083333 | 8/2006 | |
| 2010/0137827 A1 | 6/2010 | Warren et al. | WO | WO-2007/148708 | 12/2007 | |
| 2010/0204671 A1 | 8/2010 | Kraushaar et al. | WO | WO2008/028305 | 3/2008 | |
| 2010/0243099 A1 | 9/2010 | Yodfat | WO | WO 2008/115102 | 9/2008 | |
| 2012/0172829 A1 | 7/2012 | Hasegawa et al. | WO | WO 2006/138184 | 12/2009 | |

FOREIGN PATENT DOCUMENTS

| | | |
|---|---|---|
| EP | 0255025 | 2/1988 |
| EP | 0259582 | 3/1988 |
| EP | 0285424 | 10/1988 |
| EP | 0311787 | 4/1989 |
| EP | 0376629 | 7/1990 |
| EP | 0803267 | 10/1997 |
| EP | 0819442 | 1/1998 |
| EP | 0995453 | 4/2000 |
| EP | 1060730 | 12/2000 |
| EP | 1484073 | 12/2004 |
| EP | 1731128 | 12/2006 |
| FR | 2757405 | 6/1998 |

OTHER PUBLICATIONS

Japan Application No. 2003-583539, Official Action dated May 1, 2009 (3 pages).

Japan Application No. 2003-577789, Official Action dated Feb. 24, 2009 (4 pages).

International Search Report, PCT/EP2008/067535 dated Oct. 13, 2009 (3 pages).

International Search Report, PCT/EP2008/067522 dated Aug. 12, 2009 (2 pages).

* cited by examiner

CONNECTOR DEVICE

CROSS-REFERENCE TO RELATED APPLICATIONS

This application claims the benefit of U.S. Provisional Application Ser. No. 61/122,528, filed Dec. 15, 2008. The disclosure of the prior application is considered part of (and is incorporated by reference in) the disclosure of this application.

TECHNICAL FIELD

The present invention relates to a connector device for connecting a first and a second fluid container. The connector device has an improved valve arrangement which permits fluid flow in two different directions.

BACKGROUND

When transferring a liquid substance from a vessel, for example a vial, by means of an injection needle, or when adding a liquid to a dry substance for dissolving this and when further transferring the substance to the intended use, e.g. injection to a patient's blood vessel or to an infusion bottle or the like, one cannot avoid that the injection needle, by which the liquid substance is removed from the vial, gives off aerosols and drops to the environment or that the persons handling the injection needle get contaminated. Especially in cases where the substance consists of cytotoxic drugs, radio-labelled or allergy-inducing substances it is for safety reasons important that the transfer of such substances from the vial to a patient, possibly by way of an infusion bag, takes place under satisfactory conditions and also so that an air contamination imparted by the injection needle during the transfer is avoided.

One example of a connector device used for the above mentioned purposes is disclosed in the publication of US 2003070726, in which an improved fluid transfer assembly comprising a bottle connector and a drug bottle is disclosed. The bottle connector comprises a neck element to which an injector can be fixedly coupled, and second connection means to connect the bottle connector to the drug bottle. The connector has a hollow needle to penetrate a closure on the bottle. A fluid transfer channel is arranged within the hollow needle. The bottle connector further comprises a pressure compensating means comprising a flexible container and a gas channel within the hollow needle for transporting gas from the bottle to the flexible container or vice versa in order to allow fluid to be transferred via the fluid transfer channel. The gas channel includes a filter to prevent liquid passage into said flexible container as this may damage the flexible container.

The above mentioned connector has some drawbacks, one drawback is that the filter can be blocked. If the filter is blocked, the function of the flexible container is reduced and the pressure inside the bottle can instantly increase or decrease to levels which could cause difficulties with respect to handling. As mentioned above when dealing with cytotoxic drugs, radio-labelled or allergy-inducing substances, pressure increases or decreases inside the bottle can be hazardous, since in theory, it could lead to an increased risk of leakage. It therefore seems to be a need for additional improvements in this field.

Another connector, in this case a vial adaptor, is disclosed in the patent application US 2007/0106244 A1. The vial adaptor has a housing, an expandable chamber, a filter to prevent fluid from entering the expandable chamber. A check valve is arranged in the proximity of the filter to enable a one way fluid flow. The connector is however not very flexible in terms of handling nor does it provide any means by which the filter can be prevented form being obstructed, i.e. clogged. The teaching of the publication is further that it is preferable that the check valve has as low cracking pressure as possible.

SUMMARY

The above mentioned drawbacks are at least partly solved by means of a connector device according to the present invention. More precisely they are solved by a connector device for establishing fluid communication after connecting with a first fluid container and a second fluid container. The connector device comprises a housing which in turn comprises first connection means having a pierceable barrier member to connect the first fluid container, and second connection means, to connect the second fluid container, and a fluid transfer channel to enable fluid communication between the first and second fluid containers after assembly. The housing further comprises at least one pressure normalization channel arranged to normalize the pressure in the second fluid container during fluid transfer. The at least one pressure normalization channel has an outlet opening, an inlet opening, a barrier filter and at least one valve arrangement.

The at least one valve arrangement is arranged to permit fluid to flow in a first and a second direction wherein the first direction is in a direction from the inlet opening towards the outlet opening and the second direction is from the outlet opening towards the inlet opening. Furthermore, the at least one valve arrangement has a cracking pressure in the first direction.

The connector device according to the present invention provides for a connector device which has an improved valve arrangement which effectively provides for a clogging protection arrangement with respect to the barrier filter; while at the same time enable fluid communication in two directions. The first check valve and its cracking pressure enable a build up of pressure in the pressure normalization channel which partly prevents fluid from the second fluid container to reach the barrier filter during administration if the assembly for instance is; shaken; held up side down; laid down on the side or; when an excessive amount of medicaments and possibly air are returned to the second fluid container.

In an embodiment according to the present invention, the at least one valve arrangement comprises a first and a second check valve to enable the fluid flow in the first and the second direction. The first and the second check valve are preferably arranged in opposite directions and/or substantially parallel of each other. The main function is however that the first and the second check valve enable a fluid flow in the first and the second direction. By using a first and a second check valve the cracking pressure of each check valve and for each direction can be customized. As it has been found, this flexibility can be utilized to protect the filter from clogging while still permitting a fluid flow in both directions.

For instance, in one embodiment according to the present invention, the cracking pressure of the first check valve is at least 0.04 atm, preferably between 0.04-0.5 atm. The cracking pressure of 0.04 atm is enough to provide for the clogging preventing function while at the same time not impart a cracking pressure which makes the handling uncomfortable or difficult for a user, when the user is administrating or retracting medicament from the second fluid container. It has been found that a to high cracking pressure can cause a user to use an excessive amount of force during which other accidents can occur such as the device can slip from the users hands.

It is advantageous if the cracking pressure of the second check valve is as low as possible since the barrier filter is on the safe side of the check valve arrangement, i.e. no fluid is present on that side of the barrier filter and the lower the cracking pressure of the second check valve is, the easier it is for a user to retract fluid from the second fluid container. Preferably, the second check valve has a cracking pressure in the second direction of less than 0.5 atm, preferably less than 0.25 atm, even more preferably less than 0.1 atm and most preferred of less than 0.02 atm. It may optionally be between 0.02-0.5 atm, 0.02-0.25 atm or 0.02-0.1 atm.

The housing can be arranged with at least a first and a second pressure normalization channel. The first check valve is then arranged in the first pressure normalization channel and the second check valve is arranged in the second pressure normalization channel. This embodiment can be advantageous for manufacturing reasons. The first and second pressure normalization channels may or may not further have mutual inlet- and outlet openings. Optionally they can have mutual inlet opening and separated outlet opening or vice verse.

In an embodiment according to the present invention, the at least one valve arrangement comprises a membrane having at least one slit. Such a membrane provides for a cracking pressure in both the first and the second direction.

In an embodiment according to the present invention, an expandable bladder is arranged at the outlet opening of the at least one pressure normalization channel and in communication with the at least one pressure normalization channel. As such, gas which has passed through the barrier filter is not exposed to the environment but collected in the volume defined by the expandable bladder. The expandable bladder is preferably connected with a parabolic formed disc.

In an embodiment according to the present invention, the volume of the pressure normalization channel between the first check valve and the inlet opening of the pressure normalization channel is preferably relatively small. For instance, the volume can be <1 ml, preferably between 0.01 ml-0.9 ml. This enables a pressure build up inside the pressure normalization channel which effectively prevents parts of the fluid from reaching the barrier filter which thereby could cause clogging of the filter.

The present invention relates to a connector device to connect a first and a second fluid container, directly or indirectly. The connector device exhibit a first and a second connection means, a pierceable barrier member, a piercing member, a fluid transfer channel and a pressure normalization channel. The pressure normalization channel is arranged to normalize an increasing pressure inside second fluid container. A valve arrangement permitting fluid to flow in a first and a second direction is arranged in the pressure normalization channel. The valve arrangement exhibit a cracking pressure in at least the first direction. The present invention provides for a connector device which reduces the risk of clogging the barrier filter.

The present invention can be said to provide a fluid barrier to the barrier filter by means of the check valve arrangement and preferably the first and the second check valve. By this it is meant that the check valve arrangement provides directly for a hurdle, but also indirectly due to the pressure build up in the fluid transfer channel, for the fluid while permitting gas to pass the check valve arrangement and at the same time permit gas and fluid to flow in both the first and the second direction.

This advantage and other advantages will be clear after reading the detailed description of preferred embodiments according to the present invention.

The present invention also relates to a valve arrangement, as described above, for a medical device, preferably a connector device, having a fluid flow channel with an inlet opening and an outlet opening, such as a pressure normalization channel for reducing a pressure build up in a connected fluid container. The valve arrangement comprises a first and a second check valve arranged in parallel with each other so that after assembly to the fluid flow channel, the valve arrangement is arranged to permit fluid to flow in a first and a second direction, wherein the first direction is in a direction from the inlet opening towards the outlet opening and the second direction is from the outlet opening towards the inlet opening, wherein at least the first check valve has a cracking pressure. Both the first and the second check valves can be provided with a cracking pressure. The valve arrangement is further described with reference to FIGS. 1-5 below.

BRIEF DESCRIPTION OF THE DRAWINGS

The present invention will be described in greater detail with reference to the accompanying figures wherein;

FIG. 4 shows parts of a first fluid container connected to a piercing member protection device, which in turn is connected to the connector device, according to the present invention, and as shown in FIGS. 1 and 2, which in turn is connected to a second fluid container, to establish a fluid communication there between;

DETAILED DESCRIPTION

Figure 1:
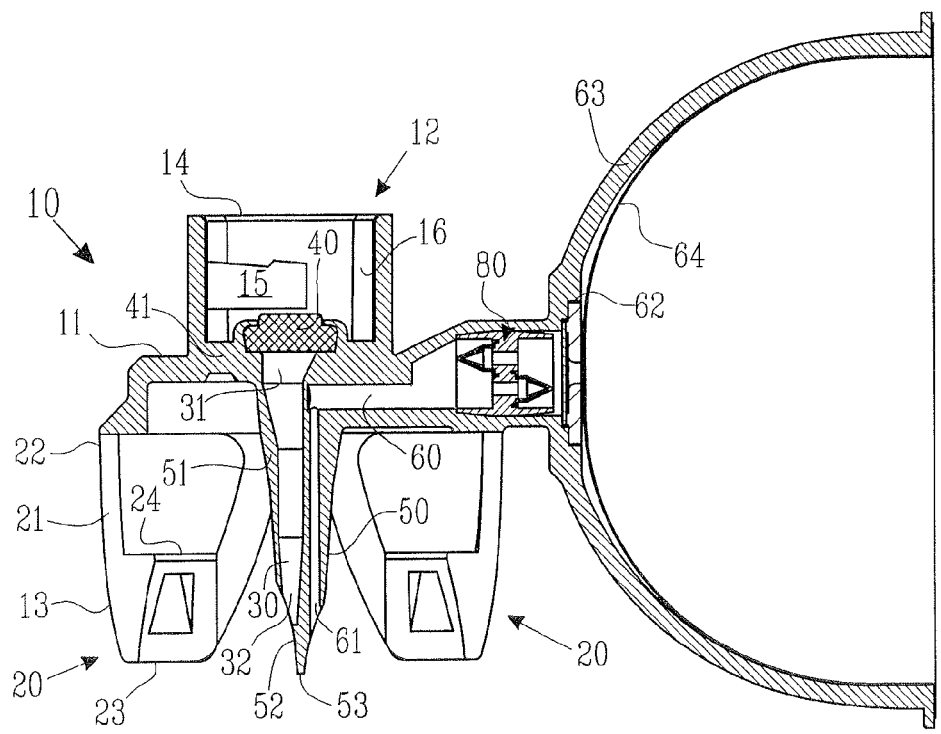
FIG. 1 shows a cross section of an embodiment of the connector device according to the present invention.
Figure 4:
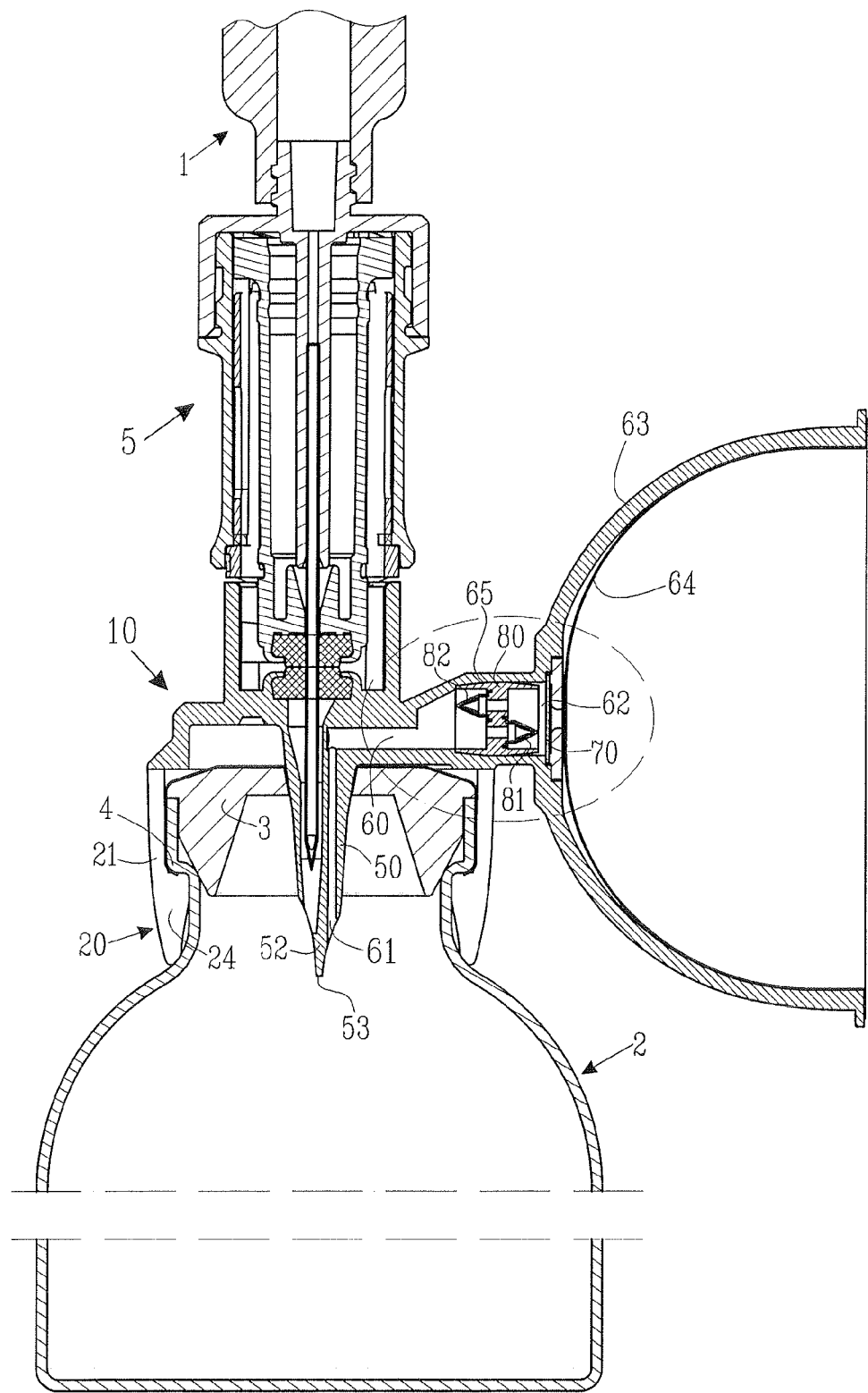

FIG. 1 shows in a cross sectional view a connector device 10 for establishing fluid communication between a first container and a second container, according to one embodiment of the present invention. The connector device 10 has a housing 11 to which a first and a second connection means 12, 13 are arranged. The first connection means 12 is substantially formed by a neck element 14 having a first and a second guiding groove 15, 16 arranged therein. The first and the second guiding groove 15, 16 is arranged to guide corresponding guiding protrusions on e.g. a piercing member protection device arranged to a first fluid container as shown in FIG. 4, to establish a firm attachment to the connector device 10 after which fluid communication can be established. The first connection means 12 is formed integrally with the housing 11. One type of connection means 12 which can be used on the connector device 10 is disclosed in the patent publication U.S. Pat. No. 6,715,520 B2 which also discloses a piercing member protection device and an appropriate first fluid container connected thereto.

The second connection means 13, which is arranged at substantially the opposite end of the housing 11 of the connector device 10 and with respect to the first connection means 12, comprises a plurality of engaging hook elements 20. Each hook element 20 comprises a flexible tongue 21 having a distal and a proximal end 22, 23. The proximal end exhibits a hook protrusion 24 arranged to engage a corresponding flange on the second container, as is shown in greater detail in FIG. 4. One example of appropriate hook elements 20 and a coupling arrangement in the form of a neck element, for the hook elements 20 are disclosed in the patent publication of U.S. Pat. No. 6,715,520 B2.

A fluid transfer channel 30 extends substantially between the first and the second connection means 12, 13. The purpose of the fluid transfer channel 30 is to permit e.g. a needle to extend through the housing 11 of the connector device 10 and to thereby permit fluid to be transferred through the connector device 10. The fluid transfer channel has a longitudinal direction with a first and a second end 31, 32. A pierceable barrier member 40 is arranged in the proximity of the first connection means 12 and at the first end 31 of the fluid transfer channel 30. The pierceable barrier member 40 provides for a liquid and gas tight seal between a piercing member and the pierceable barrier member 40 during fluid transfer so to minimize leakage and thereby exposure of hazardous medicaments to a user.

Protruding out from the housing 11 is a piercing member 50. The piercing member 50 has a proximal end 51 and a distal end 52. The fluid transfer channel 30 extends inside of the piercing member 50 in this embodiment. The proximal end 51 of the piercing member 50 is arranged in the proximity of the pierceable barrier member 40 and is supported by a supporting wall structure 41 of the housing 11. The piercing member 50 extends in a direction substantially parallel with the plurality of hook elements 20 and serves the purpose of piercing the second fluid container during assembly, as is shown in greater detail in FIG. 3. The second end 32 of the fluid transfer channel 30 is substantially at the distal end 52 of the piercing member 50, with the exception of a piercing tip 53 which extends slightly longer.

A pressure normalization channel 60 extends from the distal end 52 of the piercing member 50 and substantially parallel with the fluid transfer channel 30 inside the piercing member 50. Substantially at the supporting wall structure 41 of the housing 11, the pressure normalization channel 60 diverts in a direction perpendicular to the fluid transfer channel 30. The pressure normalization channel 60 has an inlet opening 61 arranged substantially at the distal end 52 of the piercing member 50 and an outlet opening 62. The outlet opening 62 is furthermore positioned substantially at the centre of a parabolic disc 63 having an expandable bladder 64. In FIG. 1 the expandable bladder 64 is in its unexpanded state.

Figure 2:
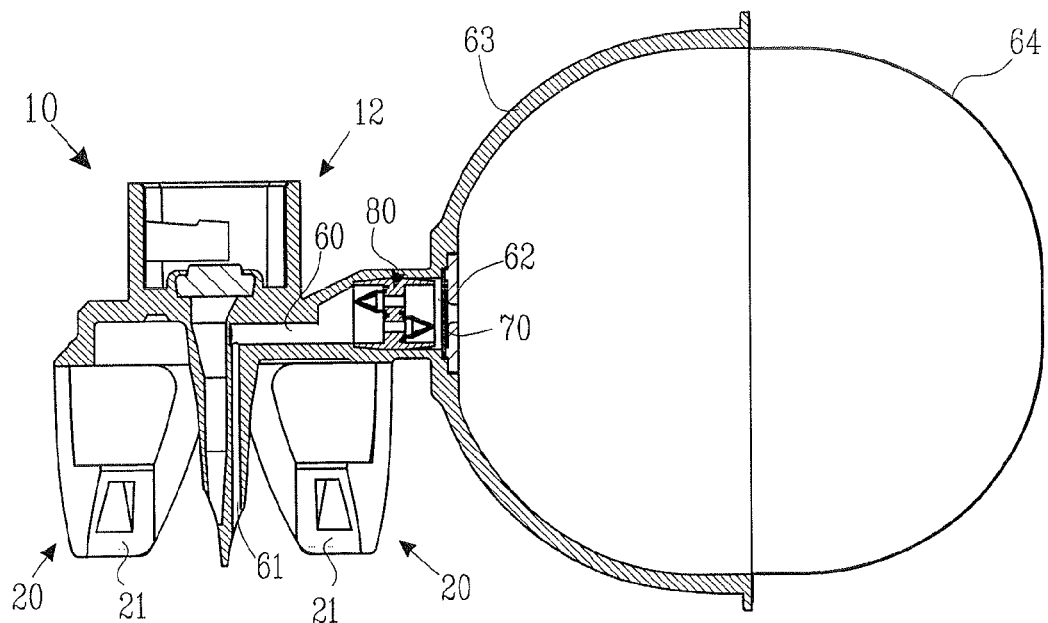
FIG. 2 shows a cross section of the connector device shown in FIG. 1 in which the expandable bladder is shown in its expanded state, i.e. filled with gas.

FIG. 2 shows the connector device 10 shown in FIG. 1 but with the difference that the expandable bladder 64 is shown in its expanded state. As can be seen in FIG. 1 and FIG. 2, and with reference to FIG. 2, the pressure normalization channel 60 comprises a barrier filter 70 arranged to cover the outlet opening 62 of the pressure normalization channel 60. The barrier filter 70 serves the purpose of preventing any fluid from reaching the expandable bladder 64 and the volume defined by the parabolic disc 63 and the expandable bladder 64. The barrier filter 70 is preferably a hydrophobic filter which permits gas to pass but prevents liquid to pass. Filters like the barrier filter 70 are know per se and will need no further description herein.

A valve arrangement 80 is positioned to intersect the fluid flow of the pressure normalization channel 60. In FIGS. 1 and 2, and in one embodiment according of the present invention, the valve arrangement 80 is positioned in the proximity of the outlet opening 62 of the pressure normalization channel 60. The main purpose of the valve arrangement 80 is to prevent clogging of the filter barrier 70 by providing a cracking pressure to the valve arrangement 80 for the fluid which flows in a direction from the inlet opening 61 to the outlet opening 62 of the pressure normalization channel 60 while permitting preferably a minimal cracking pressure in the opposite direction.

Figure 3:
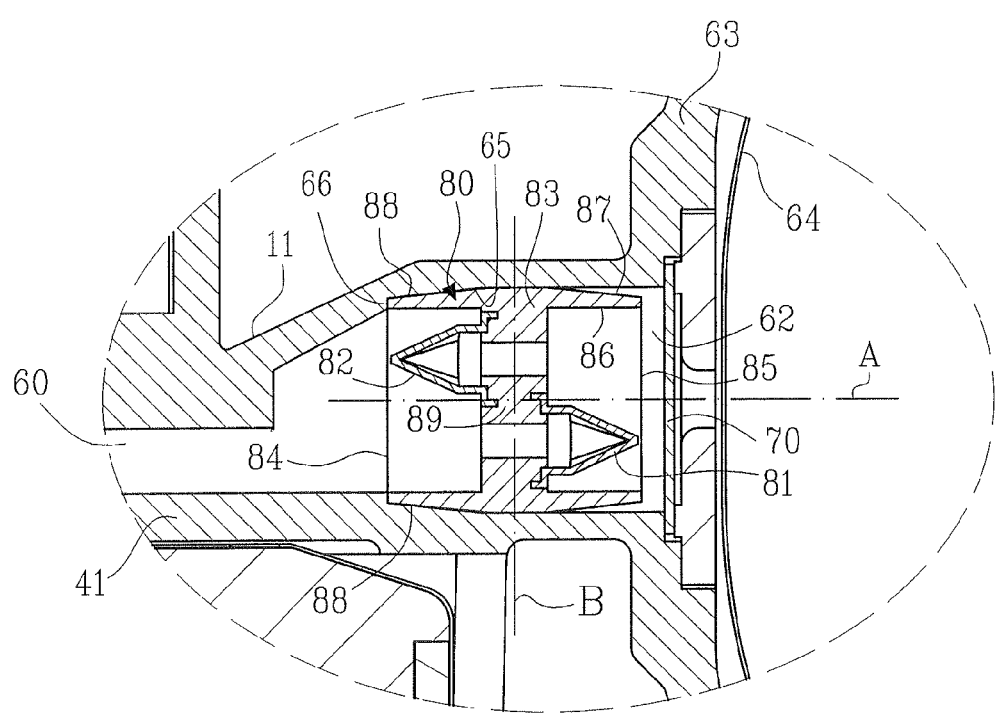
FIG. 3 shows a close up of the valve arrangement comprising a first and a second check valve as shown in FIGS. 1 and 2.

FIG. 3 shows a part of the connector device 10 seen in greater detail. More specifically, FIG. 3 shows part of the pressure normalization channel 60, the outlet opening 62 of the pressure normalization channel 60, parts of the supporting wall structure 41, parts of the parabolic disc 63 and parts of the expandable bladder 64, the barrier filter 70 and the valve arrangement 80. In the shown embodiment, according to the present invention, the valve arrangement 80 comprises a first and a second check valve 81, 82. It should be noted that valve arrangement 80 is positioned to snugly fit inside the pressure normalization channel 60 as a separate component. This is done for manufacturing reasons, although it is possible that the valve arrangement 80 and the first and the second check valves 81, 82 are integrated parts of the housing 11.

The valve arrangement 80 comprises a substantially cylindrical housing 83 with a longitudinal centre line A and a transverse centre line B. The cylindrical housing 83 exhibits a first and a second end 84, 85 and an inner and outer surface 86, 87. The outer surface 87 of the cylindrical housing 83 is positioned towards an inner surface 65 of the pressure normalization channel 60 so as to provide for a liquid and gas tight seal there between. The outer surface 87 of the cylindrical housing 83 is further provided with a slightly tilting surface 88, which tilts towards the longitudinal centre line A of the cylindrical housing 83 so that a substantially wedge-like form is provided at least at the first end 84 of the cylindrical housing 83. The inner surface 65 of the pressure normalization channel 60 is likewise tilted in a direction towards the longitudinal centre line A of cylindrical housing 83, to provide for a substantially funnel-like form and to receive the tilting surface 88 of the cylindrical housing 83. The tilting surfaces provides for a secure attachment of the valve arrangement 80 to the pressure normalization channel 60. The cylindrical housing 83 is further equipped with a centre wall 89 extending out from the inner surface 86 of the cylindrical housing 83 and towards the longitudinal centre line A. The first and the second check valves 81, 82 are attached to the centre wall 89 in opposite directions so that the second check valve 82 prevents fluid from flow, through the second check valve 82, in a direction from the inlet opening 61 towards the outlet opening 62, while the first check valve 81 prevents fluid from flow, through the first check valve 81, in a direction from the outlet opening 62 to the inlet opening 61.

The inner surface 65 of the pressure normalization channel 60 can further be provided with a recess 66 to receive the cylindrical housing 83 so that the inner surface 86 of the cylindrical housing 83 is aligned with the inside of the pressure normalization channel 60 which provides for a smooth transition there between.

The first and the second check valves 81, 82 can be of any conventional type although some preferred are listen below. For instance, the first and the second check valve 81, 82 can be a ball check valve, in which the disc, the movable part to block the flow, is a spherical ball. The ball can be spring-loaded to help keep it shut. In the case of no spring load on the ball, reverse flow is required to move the ball towards the seat and create a seal. The interior surface of the main seats of the ball check valves are more or less conically-tapered to guide the ball into the seat and form a positive seal when stopping reverse flow. Optionally, the ball can be replaced by a poppet energized by a spring.

The first and the second check valves 81, 82 can optionally be a diaphragm check valve. Such check valve uses a flexing rubber diaphragm positioned to create a normally-closed valve. Pressure on the upstream side must be greater than the pressure on the downstream side by a certain amount, known as the pressure differential, for the check valve to open allowing flow. Once positive pressure stops, the diaphragm automatically flexes back to its original closed position.

Optionally can swing check valves be used. A swing check valve is a butterfly-style check valve in which a disc, the movable part to block the flow, swings on a hinge or trunnion, either onto the seat to block reverse flow or off the seat to allow forward flow. The seat opening cross-section may be perpendicular to the centerline between the two ports or at an angle. Optionally can a clapper valve be used having a hinged gate, preferably with a biasing spring to urge it shut. Optionally lift check valves can be used. Combinations of the above mentioned check valves are of course also possible.

The first and the second check valves 81, 82 can optionally be replaced by a membrane having at least one slit. This embodiment is however less preferable.

With reference to FIG. 4, the function and advantages of the connector device 10 according to the present invention will be described in greater detail. FIG. 4 shows the connector device 10 shown in FIGS. 1-3. As can be seen, the connector device 10 is assembled via its first connection means 11 to a piercing member protection device 5, which in turn can be connected to a first fluid container 1, e.g. a syringe, and via its second connection means 12 with a second fluid container 2. As the connector device 10 is assembled with the second fluid container 2, the distal end 52 and especially the piercing tip 53 of the piercing member 50 is pierced through a septum 3 arranged to cover the opening of the second fluid container 2. The hook elements 20 fixedly connects the connector device 10 as the flexible tongues 21 having hook protrusions 24 engages the corresponding flange 4 on the second fluid container 2. After assembly, a user is enabled to insert fluid into the second container 2, or optionally to retract fluid.

As a fluid is inserted into the second fluid container 2, using the piercing member protection device 5, an overpressure is created inside the second fluid container 2. In normal circumstances the pressure normalization channel 60 would directly normalize the pressure inside the second fluid container 2 by relieving the pressure inside the second fluid container 2 to the expandable bladder 64 (seen in its expanded state in FIG. 2). With a connector device 10 according to the present invention, the first check valve 81 has a cracking pressure, in the shown embodiment, of about 0.04 atm. As there is a small cracking pressure of the first check valve 81 and the pressure normalization channel 60 has a relatively small volume, in this embodiment according to the present invention <1 ml, a relatively high counter pressure is quickly built up in the pressure normalization channel 60 between the inlet opening 61 and the first check valve 81. The relatively high counter pressure efficiently reduces the amount of medicament which reaches the barrier filter 70 and thereby significantly reduces the risk of clogging the barrier filter 70. While at the same time, the cracking pressure of the first check valve 81 is low enough not to cause any inconvenience to the user.

The second check valve 82 preferably has a low cracking pressure so that retraction of gas from the expandable bladder 64 can be done as simply as possible, e.g. when a user retracts fluid from the second fluid container 2.

By having a first and a second check valve 81, 82 the cracking pressures of each check valve 81, 82 can be customized, permitting a very flexible valve arrangement 80 which can be fitted to any connector device, independently of the size of the pressure normalization channel used for that specific connecter device.

In an embodiment according to the present invention, the pressure normalization channel can comprise two individual channels in which the first check valve 81 is positioned in one channel and the second check valve 82 is positioned in another channel. The two individual channels can have mutual inlet and openings.

Figure 5A:
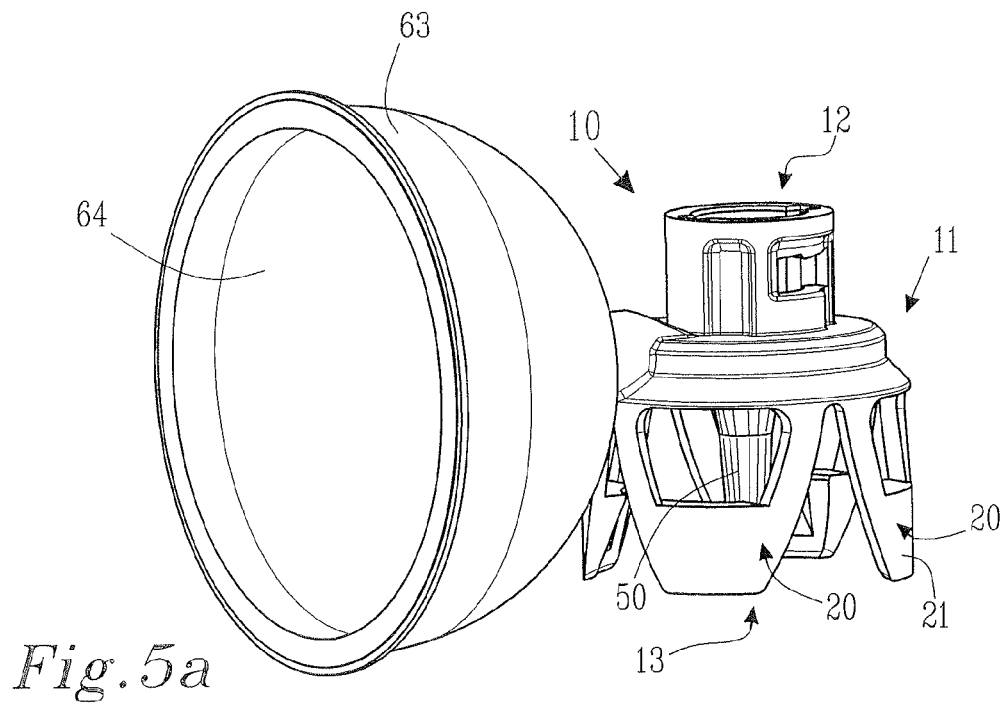
FIG. 5a-5b shows the connector device shown in FIGS. 1-4, as seen in perspective with expandable bladder in its un-expanded state respectively in its expanded state.
Figure 5B:
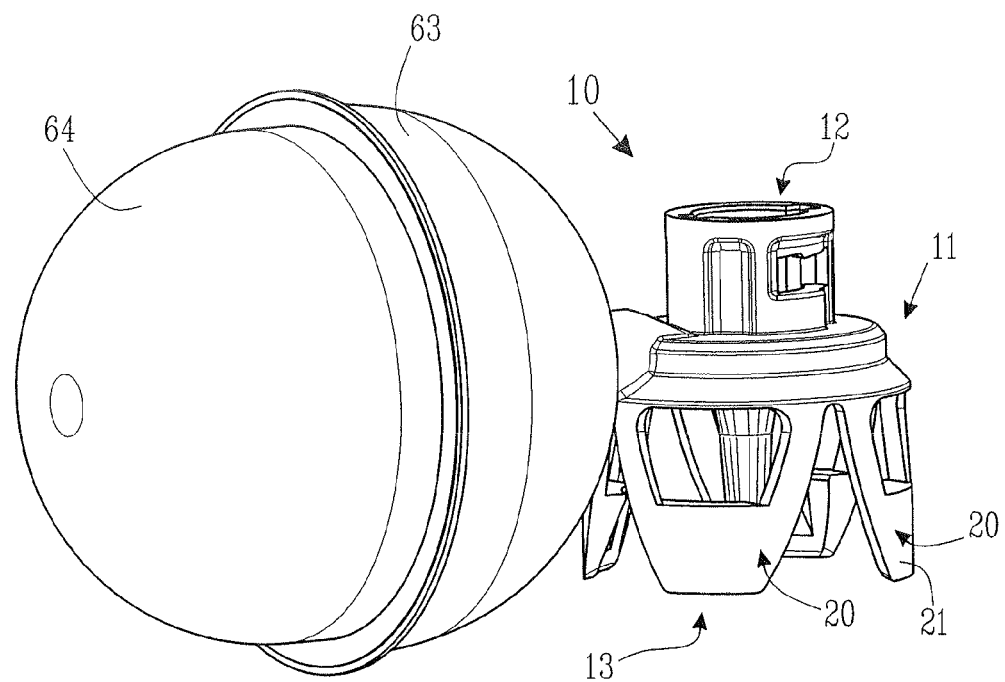

FIG. 5a-5b shows the connector device as shown in FIGS. 1-4. FIG. 5a shows the expandable bladder 64 before expansion, while FIG. 5b shows the expandable bladder after expansion, i.e. being filled with gas. Furthermore the first connection means 12 and the second connection means 13 is seen as being formed as an integrated part of the housing 11 of the connector device 10. The hook elements 20 having the flexible tongues 21 and the piercing member 50 in which both the fluid transfer channel 30 and the pressure normalization channel 60 extends. The pressure normalization channel 60 is in communication with the volume defined by the expandable bladder 64 and any fluid container connected to the connector device 10 by means of the second connection means 13.

EXAMPLE

Without being bound by theory, a non-limiting example of how the impact of the present invention can be estimated will be described below. The non-limiting example uses an assembly as shown in FIG. 4.

The second fluid container 2 has a total volume of 120 ml ($V_{tot}$) but is only filled with 100 ml of a cytotoxic liquid ($V_l$).

30 ml is intended to be aspired although 32 ml of liquid is actually aspired from the second fluid container 2, leaving 52 ml of gas inside the second container 2. Alternatively some air bubbles are aspirated into the syringe so that for example 0.5 ml or air is inside the syringe and 51.5 ml is inside the second container 2.

Assuming that the volume of the pressure normalization channel 60 is $V_{pnc}$=1 ml. The total volume of the gas inside the system is then 53 ml. As the aspiration starts, the pressure which surrounds the inlet opening 61 of the pressure normalization channel 60 ($P_{pnc\ opening}$) is:

the atmospheric pressure ($P_{atm}$)+the pressure from the liquid column ($P_{lc}$).

The height of the liquid column is assumed in this case to be about 50 mm (although different diameter of the second fluid container would give a different liquid column), hence;

$$P_{atm} + P_{lc} = P_{pnc\ opening}$$

1 atm+0.005 atm=1.005 atm

If 2 ml of fluid-liquid and/or air is injected back into the second fluid container 2 then:

$$P_{pnc\ opening} = 1.005 \cdot \left(\frac{53\ ml}{51\ ml}\right) = 1.044\ atm$$

Having a check valve arrangement 80 with a first check valve 81 with a cracking pressure of about 0.05 atm, the cracking pressure of the first check valve 81 is not reached, hence the first check valve is not opened by the imparted pressure.

The amount of fluid which penetrates the pressure normalization channel 60 is then:

$$1 - \left(1 \cdot \frac{1{,}005}{1{,}044}\right) = 0.037 \text{ ml}$$

Hence in the current example, only about 0.04 ml of liquid will penetrate into the pressure normalization channel 60 although as much as 2 ml has been re-introduced into the second fluid container. As only a low amount of liquid penetrates the pressure normalization channel 60, the risk of clogging the barrier filter is substantially reduced.

What is claimed is:

1. A connector device for establishing fluid communication by connecting a first fluid container with a second fluid container, said connector device comprising a housing, said housing comprises first connection means having a pierceable barrier member, connect said first fluid container to said housing, and second connection means, to connect said second fluid container,
   and a fluid transfer channel to enable fluid transfer between said first and second fluid container after assembly,
   said housing further comprises at least one pressure normalization channel arranged to normalize the pressure in said second fluid container during said fluid transfer,
   said at least one pressure normalization channel having an outlet opening, an inlet opening, a barrier filter and at least one valve arrangement, wherein
   said at least one valve arrangement is arranged to permit fluid to flow in a first and a second direction, wherein said first direction is in a direction from said inlet opening towards said outlet opening and said second direction is from said outlet opening towards said inlet opening, and wherein said at least one valve arrangement has a cracking pressure in at least said first direction.

2. The connector device according to claim 1, wherein said at least one valve arrangement comprises a first and a second check valve arranged in substantially opposite direction of each other.

3. The connector device according to claim 2, wherein said first and second check valves are arranged substantially parallel with each other.

4. The connector device according to claim 2, wherein said cracking pressure of said first check valve is at least 0.04 atm.

5. The connector device according to claim 2, wherein said cracking pressure of said first check valve is between 0.04-0.5 atm.

6. The connector device according to claim 3, wherein said cracking pressure of said first check valve is at least 0.04 atm.

7. The connector device according to claim 3, wherein said cracking pressure of said first check valve is between 0.04-0.5 atm.

8. The connector device according to claim 1, wherein said second check valve has a cracking pressure in said second direction.

9. The connector device according to claim 8, wherein said cracking pressure of said second check valve is between 0.02-0.5 atm.

10. The connector device according to claim 1, wherein said housing comprises a first and a second pressure normalization channel and wherein said first check valve is arranged in said first pressure normalization channel and wherein said second check valve is arranged in said second pressure normalization channel.

11. The connector device according to claim 10, wherein said first and second pressure normalization channels have mutual inlet and outlet openings.

12. The connector device according to claim 1, wherein said at least one valve comprises a membrane having at least one slit.

13. The connector device according to claim 1, further comprising an expandable bladder arranged at said outlet opening of said at least one pressure normalization channel and in communication with said at least one pressure normalization channel.

14. The connector device according to claim 1, wherein the volume of the pressure normalization channel between said first check valve and the inlet opening of the pressure normalization channel is <1 ml.

15. The connector device according to claim 14, wherein the volume of the pressure normalization channel between said first check valve and the inlet opening of the pressure normalization channel is between 0.01 ml-0.9 ml.

* * * * *